Figure 1:
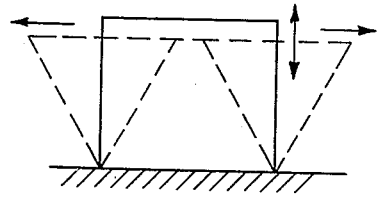

April 8, 1941.  K. SCHWARZ ET AL  2,237,916
ELECTRIC MOTOR MOUNTING
Filed Aug. 31, 1939    2 Sheets-Sheet 1

Inventor
Karl Schwarz & Hermann Freese

Attorney

Patented Apr. 8, 1941

2,237,916

UNITED STATES PATENT OFFICE 2,237,916

ELECTRIC MOTOR MOUNTING

Karl Schwarz and Hermann Freese, Berlin, Germany, assignors to Telefunken Gesellschaft für Drahtlose Telegraphie m. b. H., Berlin, Germany, a corporation of Germany Application August 31, 1939, Serial No. 292,942
In Germany August 19, 1938

3 Claims. (Cl. 172—36)

This invention relates to electric motors of the synchronous type, and more particularly to mountings for such motors.

Recently, drive motors for record players and sound recording apparatus have become known in which the stator and rotor are provided with pronounced poles and are made of cast iron. The excitation of the motor takes place by means of a single exciter coil fed with alternating current. These motors are characterized by a very effective synchronism. Furthermore, they have the advantage of operating without a special D. C. excitation requiring but a single exciter coil fed from a suitable A. C. source.

Now, it has been found that during operation, these motors produce a hum which is found to be particularly annoying in apparatus employed for making sound records on record plates, and this is also true in the case of record players. When using such motors in such apparatus, it also happens, in certain cases, that the slight jerking movement of the motor inherent in the operating principle causes disturbances. The hum noises are produced, on the one hand, on account of the operation with alternating current, and on the other hand, on account of slight changes in the air gaps between stator and rotor. These changes are caused by eccentricities of the shaft or slight irregularities in the circular dimension of the rotor or of the stator. This hum noise is observed as a rhythmic noise at every complete or half revolution.

Now, the said hum noises are transmitted to the base plate and to the record table proper and can cause very considerable disturbances, especially if, in addition, resonance actions occur. In case of sound recording apparatus, the depth of the recorded groove may change due to vibration of the record table and the completed record plate may be subjected to a modulation with the frequency of the disturbance. These disturbance oscillations of the stator and/or of the rotor may produce acoustical disturbances directly.

It is customary to mount the synchronous motors of this type on rubber cushions in order to permit the stator to yield in a tangential direction to facilitate the starting and to avoid deviation from synchronism in case of overload. Now, since a considerable component of the disturbance acts in the tangential direction, these rubber cushions are subjected also to tangential forces. When the rubber cushions are acted upon in this way, an axial component also appears which is transmitted to the housing or to the record table, and this component is largely responsible for certain of the above noted disturbances.

Figure 2:
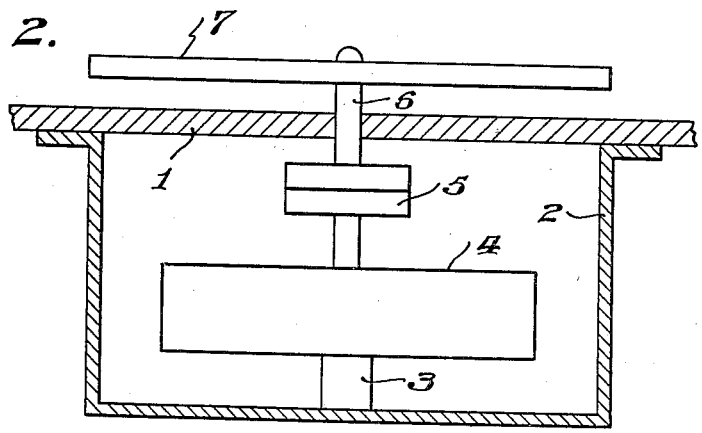
Figure 3:
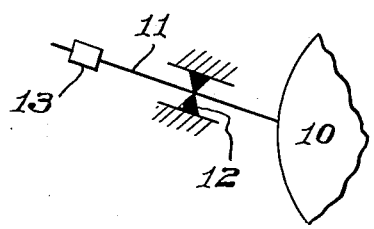
Figure 4:
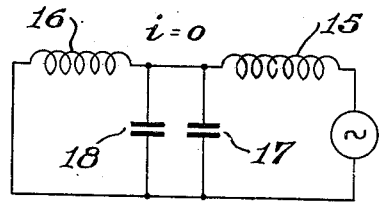
Figure 5:
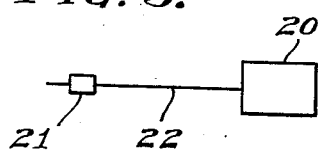
Figure 6:
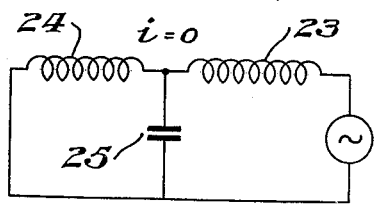
Figure 6:
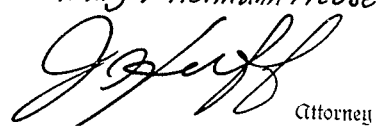
Figure 7:
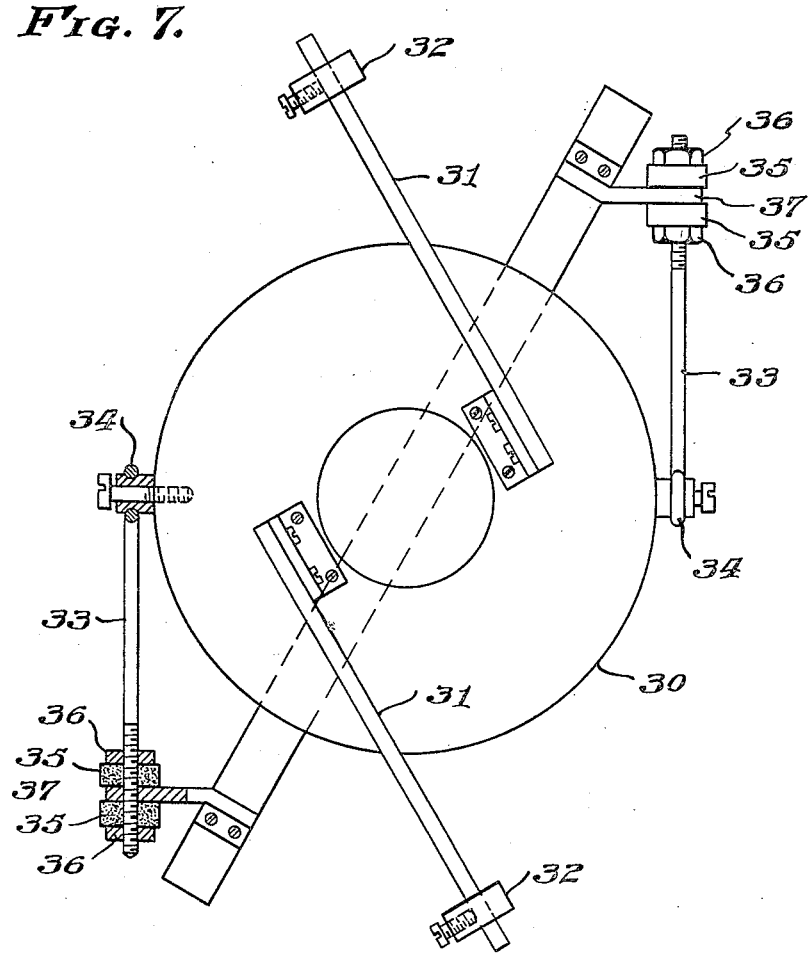

In the accompanying drawings, which illustrate several forms of our invention,

Figure 1 is a diagrammatic view illustrating the effect of tangential forces applied to the rubber cushion, Figure 2 is a central sectional view of a synchronous motor embodying our invention, Figure 3 is a fragmentary view showing one arrangement employing the principle of our invention, Figure 4 is an electrical wiring diagram corresponding to the system of Figure 3, Figure 5 is a diagrammatic view of the system arranged according to our invention wherein the useful torque is taken up at the stator, Figure 6 is an electrical wiring diagram corresponding to the system of Figure 5, and Figure 7 shows another motor structure embodying the principles of our invention.

In the accompanying drawings, Figure 1 shows the action of the tangential component upon such a rubber cushion. For the sake of simplicity, there is shown, in solid lines, a rectangular rubber cushion which is fixedly supported on one side and has a square cross section. The tangential component causes the square to assume the shape of a rhomboid whose height is smaller than the original height, as shown by the dash lines. When the direction in which the forces act is reversed, the rubber cushion again assumes its original shape of rest which signifies that there appears a component in the axial direction. Hence, in order to eliminate hum noises, the essential task is to take care that the weight of the stator is taken up without then causing a conversion into axial components of tangential disturbance components which may appear. This is accomplished, according to my invention, by making the stator rest on a rubber cushion which is located under the center of gravity of the stator and has a small diameter while being of a height limited only by the buckling strength of the rubber.

Figure 2 shows the mounting of a synchronous motor on such a cushion. The top of a mounting plate 1 has a frame 2 attached thereto which supports a synchronous motor 4 on a rubber cushion 3, the motor driving the shaft 6 of a record table and the record table 7 through a coupling 5.

This support of the stator of the motor is generally insufficient. In order to take up the useful torque, the stator is to be supported further at the outer edge. This, again, involves the danger that tangential disturbance components eventually present act on a comparatively great leverage whereby considerable vibrations may be produced. In order to compensate for these disturbance oscillations, there is arranged at the stator symmetrical to the center of gravity of the motor one or several mechanical oscillatory circuits consisting of a weight and of a spring and which are tuned to the disturbance frequency. The useful torque which in fact tends to move the stator is taken up in the nodal point of the spring, or at the stator proper. The structures of the mechanical oscillatory circuits to be considered for these two cases differ from one another.

Figure 3 shows one arrangement in which the useful torque is picked up in the nodal point of the spring. The stator 10 has a spring 11 fastened thereto which is supported in the nodal point at 12 from the top plate of the housing, or from another stationary part of the apparatus. The free end of the spring 11 adjustably carries the weight 13 thereon. The oscillatory system consisting of the stator and the spring arm between stator and the support 12, and the oscillatory system consisting of the spring arm between the support 12 and the weight 13 are tuned each to 100 C. P. S. in the case where a disturbance component of 100 C. P. S. is to be eliminated.

The analogous electrical condition is shown in Figure 4. The mass of the stator is represented by the comparatively large inductance 15 and the mass of the smaller counterweight 13 is shown by the smaller inductance 16. The inductance 15 has assigned thereto a comparatively low capacity 17 (comparatively short length of the spring) and the inductance 16 has assigned thereto a comparatively high capacity 18 (comparatively great length of the spring). It is clearly seen that the parts 16, 18 and 15, 17 can be tuned to the disturbance frequency and that, if these parts are in resonance, the current $i$ equals zero at the conecting point of these parts. At this point the mechanical combination is at rest (node of the oscillatory system) since the velocity of the mechanical system corresponds to the current in the electrical substitution diagram. Hence, no vibrations will be transmitted to the top plate of the housing, etc.

The arrangement shown furnishes rather favorable results. However, it is necessary that both oscillatory circuits are correctly tuned which, on account of the mounting in the nodal point, may cause difficulties in practice. Therefore, in accordance with a further feature of the invention, the system is so arranged that the useful torque will be taken up at the stator proper. The mechanical circuit diagram corresponds to the principal diagram according to Figure 5. The stator 20 is hereby practically at rest. The weight 21 is fastened to the stator by means of the spring 22. The vibrating system formed by the weight 21 and the spring 22 is again tuned to the disturbance frequency of, for instance, 100 C. P. S. The comparatively large mass of the stator is again represented by the comparatively large inductance 23 (Figure 6). The mass of the weight 21 is represented by the smaller inductance 24. The spring 22 is represented by the condenser 25.

It can be readily seen that if the circuit 24, 25 is tuned to 100 C. P. S., no current can flow through this circuit and hence also through the inductance 23, but this signifies that the stator can be connected at the edge with the top plate of the housing, or at the supporting body without any transmission of vibrations taking place since, in fact, the current passing through the coil 23 and which corresponds to the velocity of the movement of the stator is null.

The structure of this arrangement is shown in Figure 7. The springs 31 together with the adjustable weights 32 are fastened to the stator 30. The weights are so set that the vibrating system is tuned to the disturbance frequency. The taking up of the torque at the stator takes place by means of a lever 33 having at its end an eye 34 lined with rubber, said eye being placed around a screw attached to the stator. The lever 33 is connected with the stationary part of the top plate of the housing across rubber cushions 35 which are pressed by nuts 36 against the lever 37 rigidly connected with the top plate of the housing, or with the housing proper. The said taking up of the useful torque by means of the lever 33 and the eyes and mounts for the rubber cushions has the purpose of providing a sort of ball joint with comparatively high damping whereby tangential components eventually present can no longer be transformed into axial components, or whereby such tangential components are damped effectively, in a manner similar to the aforedescribed support of the stator on the lower rubber cushion. If a rigid lever is used for the taking up of the torque, disturbing axial components may appear. If necessary, there may be provided an additional damping through air similar to the construction known in the pneumatic cover supports, provided that tangential components should still be encountered despite the taking up of the useful torque.

In the example of construction according to Figure 7, two mechanical vibration circuits (springs with weight) are employed. Obviously, it is directly possible to provide 3, or 4 or $n$ such springs and weights which are to be arranged symmetrically to the center point of the motor.

It should further be remarked that these mechanical vibratory systems should be damped as little as possible, while the parts serving for the suspension and for taking up the torque should be constructed to have a possibly high damping.

We claim as our invention:

1. In sound translating apparatus employing a synchronous motor having a stator subject to slight oscillations and a cooperating rotor, the combination with said stator of a supporting frame, a plurality of resilient members connected to said stator and said frame, a mass carried by each of said resilient members, said resilient members and their masses constituting tuned systems tuned to the frequency of said oscillations, and said systems being arranged symmetrically with respect to the center of gravity of said stator, and said resilient members being connected to said frame at their node points.

2. The invention set forth in claim 1 characterized in that said resilient members are constituted by leaf springs, and characterized further in that said masses are constituted by weights slidably mounted on said springs.

3. The invention set forth in claim 1 characterized by the addition of means for supporting said stator along an axis passing through the center of gravity thereof, and characterized further in that said means is constructed and arranged to prevent conversion of tangential disturbances in said stator due to rotary oscillations thereof into axial disturbances of said stator.

KARL SCHWARZ.
HERMANN FREESE.